W. C. EVANS.
CAMERA TRIPOD.
APPLICATION FILED JAN. 10, 1908.
916,286.
Patented Mar. 23, 1909.
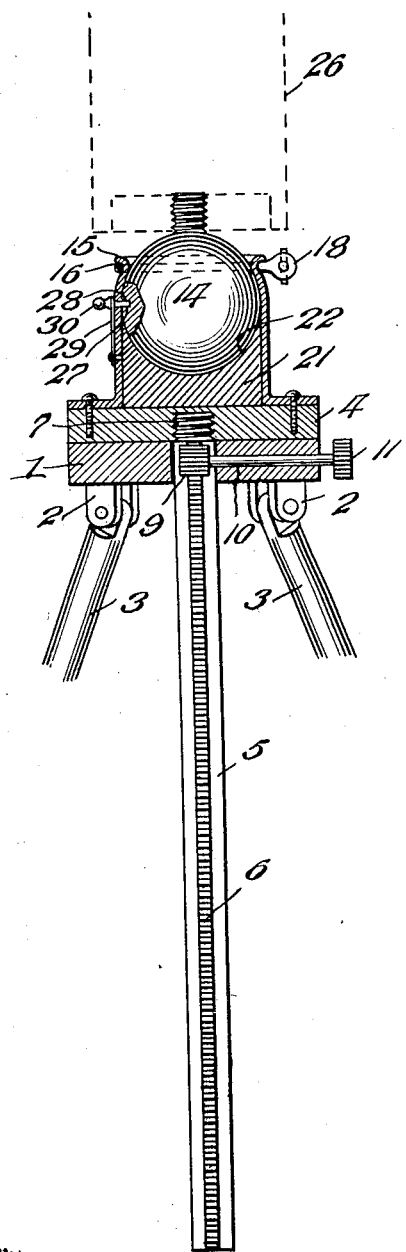
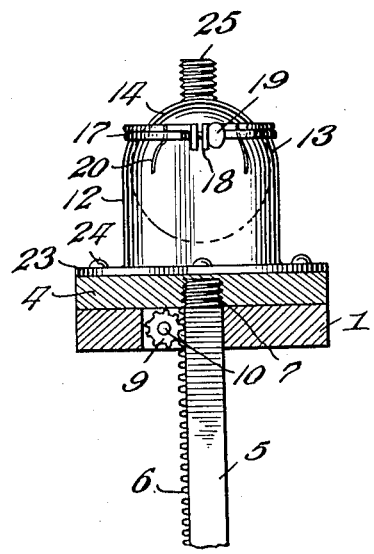
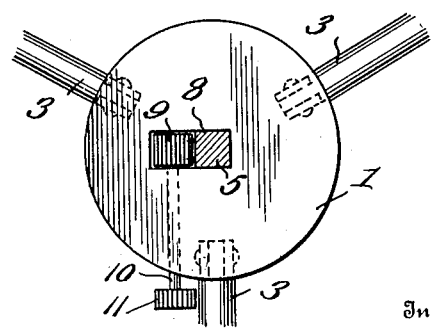
Witnesses
Frank B. Hoffman
R. M. Smith
Inventor
William C. Evans
By Victor J. Evans
Attorney

UNITED STATES PATENT OFFICE.

WILLIAM C. EVANS, OF ELIZABETH, NEW JERSEY.

CAMERA-TRIPOD.

No. 916,286.

Specification of Letters Patent.

Patented March 23, 1909.

Application filed January 10, 1908. Serial No. 410,164.

*To all whom it may concern:*

Be it known that I, WILLIAM C. EVANS, a citizen of the United States, residing at Elizabeth, in the county of Union and State of New Jersey, have invented new and useful Improvements in Camera-Tripods, of which the following is a specification.

This invention relates to camera tripods, the object of the invention being to provide a tripod by means of which the camera may be accurately leveled irrespective of the tripod legs and also adjusted up or down after such level has been obtained and without destroying the level previously obtained.

A further object of the invention is to provide means whereby the camera may be tilted to any desired angle relative to the tripod head, a universal joint being established between the camera and the tripod so as to admit of such angular adjustment in any direction. After the adjustment referred to has been obtained, the camera may raised or lowered to any desired extent without disturbing the angularity of the camera.

With the above and other objects in view the nature of which will more fully appear as the description proceeds, the invention consists in the novel construction, combination and arrangement herein fully described, illustrated and claimed.

In the accompanying drawings, Figure 1 is a sectional elevation of the tripod embodying the present invention. Fig. 2 is a similar view showing the ball and socket member in elevation and the tripod head in section. Fig. 3 is a plan view of the tripod head with the attachment removed.

Referring to the drawings, 1 designates the main section of the tripod head which is provided with the pendent lugs 2 to which the tripod legs 3 are pivotally connected in the usual manner.

In carrying out the present invention, the tripod head is provided with an adjustable section 4 preferably of the same size and shape as the main section 1 and adapted to rest directly on the section 1, as shown in Figs. 1 and 2.

Connected to the adjustable section 4 and extending downwardly therefrom is a rack 5 toothed on one side as shown at 6, said rack being provided at its upper end with a threaded extension 7 which screws into a correspondingly threaded socket in the adjustable section 4. The rack bar 5 passes through an opening 8 in the main head section 1 of the head of the tripod.

Meshing with the teeth of the rack 5 is a pinion 9, the shaft 10 of which extends outwardly through an opening in the main head section 1 where it is provided at a convenient point with a milled operating head 11 by means of which the pinion 9 may be turned to move the rack 5 up and down and correspondingly raise and lower the adjustable section 4 of the tripod head.

Mounted on the adjustable section 4 of the tripod head is a ball and socket device or support for the camera, said device comprising a contractible spring socket member 12 which, in the preferred embodiment of the invention is cylindrical as shown in Fig. 2 with the exception of the upper portion thereof which is accurately curved inward, as indicated at 13, to correspond with the curvature of a ball or sphere 14 which is held within the socket member 12, as shown in Fig. 1. The extreme upper edge of the socket member 12 is turned outward to form a bead or flange 15 and in that way a groove or ring seat 16 is formed adjacent to the top edge of the socket member 12 wherein a clamping ring 17 is placed. This clamping ring is divided at one side and the ends of the ring are enlarged, as shown, to form oppositely located eyes 18 in which is inserted a clamp screw 19, one of the eyes being internally threaded to be engaged by said screw 19 while the opening in the other eye is left smooth to permit said screw to turn freely therein. The upper portion of the socket member 12 is further split at intervals as indicated at 20 to impart greater flexibility and resiliency thereto to permit the upper edge portion of the socket member to be contracted by the clamp ring 17, so as to enable the ball to be firmly clasped by the socket member.

In the lower portion of the socket member 12 there is arranged a seat block 21 which preferably fills the lower portion of the socket member, the upper part of said seat block being concaved as shown at 22 to conform to the outer surface and curvature of the ball 14. When the clamp ring 17 is tightened the ball is not only clamped by the socket member 12, but is also forced into firm frictional engagement with the seat block 21 and thereby effectually held from any movement whatever. The socket member 12 may be secured to the adjustable head section 4 in any convenient manner, said socket member being shown as provided with a base flange 23 of the same size as the head section 4 and secured firmly thereto by suitable fasteners 24.

The ball member 14 is provided with an upstanding screw stud 25 upon which the camera box, indicated at 26, is adapted to be screwed tightly as indicated by dotted lines in Fig. 1. The ball 14 is provided at a suitable point with a socket 27 adapted to receive a catch 28 shown in the form of a pin which is carried by a spring 29 arranged outside of the socket member and secured thereto at one end, the catch 28 passing through the opening in the socket 12 and engaging the ball, as shown in Fig. 1, to prevent rotation thereof in the act of applying the camera box to the tripod and removing the same therefrom.

30 designates a thumb piece to facilitate the manipulation of the catch 28.

From the foregoing description, it will be understood that the camera may be accurately leveled or adjusted to any desired angle by displacing the catch 28 and loosening the clamp screw 19 and thereafter turning the ball 14 so as to dispose the camera at the desired angle. The clamp screw 19 is then tightened and the ball member of the device is securely held against further movement. While maintaining the adjustment just referred to, the adjustable tripod head section 4 may be raised and lowered so as to bring the camera to any desired point of elevation by means of the rack and pinion mechanism hereinbefore described.

Having described the invention, what I claim as new is:—

1. A tripod for the purpose set forth comprising a ball and socket device for the support of the camera, the ball member having a threaded stud to receive the camera, the socket member being provided with a resilient portion and a clamping ring encircling the resilient portion of the socket member, substantially as and for the purpose described.

2. A tripod for the purpose set forth comprising a tripod head and a ball and socket device for securing a camera to the tripod, consisting of a socket member having a resilient portion, a seat block arranged therein, a clamping ring encircling the resilient portion of the socket, and a ball member having a threaded stud for engaging the camera.

3. A tripod for the purpose set forth comprising a tripod head, and a ball and socket device for holding the camera thereon, consisting of a socket member having a spring portion, a clamp ring encircling said spring portion, a ball member held in the socket member and having means for the attachment of the camera thereto, and a catch on the socket member movable into and out of interlocked engagement with the ball member, substantially as described.

In testimony whereof I affix my signature in presence of two witnesses.

WILLIAM C. EVANS.

Witnesses:
F. F. SLEENSGAED,
T. H. WEIR.